DENNISSON & KIRKPATRICK.
Car-Track Clearer.
No. 1,267. Patented July 29, 1839.
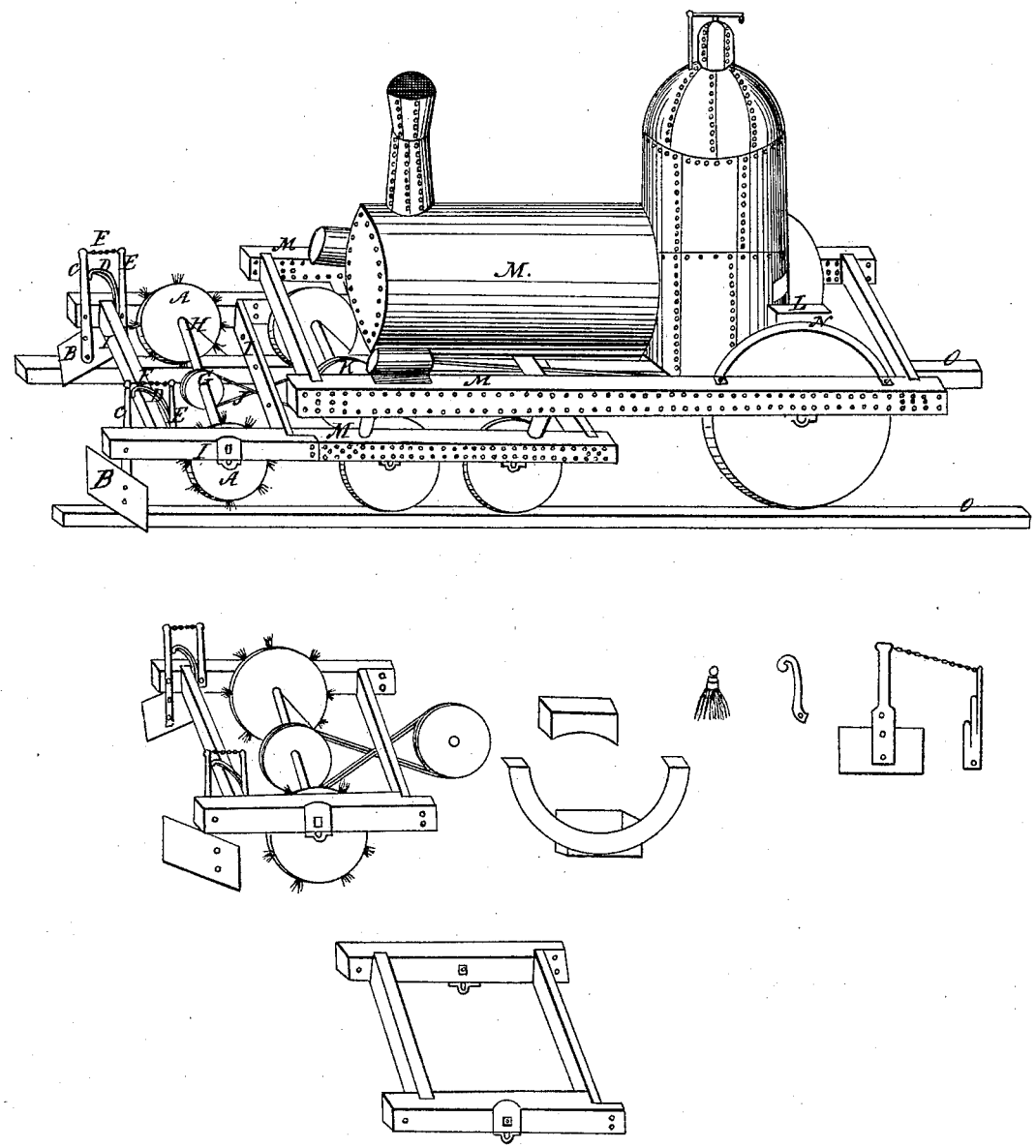
Witnesses:
Inventor:

UNITED STATES PATENT OFFICE.

JOHN N. DENNISSON AND ELIAS KIRKPATRICK, OF PLAINFIELD, NEW JERSEY.

MACHINE FOR CLEANING RAILROAD-TRACKS.

Specification of Letters Patent No. 1,267, dated July 29, 1839.

*To all whom it may concern:*

Be it known that we, JOHN N. DENNISSON and ELIAS KIRKPATRICK, of Plainfield, in the county of Essex, and State of New Jersey, have invented a new and Improved Mode of Applying Brushes and Scrapers for Clearing Railroad-Tracks from Ice, Snow, and other Obstructions; and we do hereby declare that the following is a full and exact description, and that the drawings accompanying this are a correct representation of the machine, by means of which said brushes and scrapers are applied.

Our invention consists of a square or oblong frame of a proper size to be attached in front of a car or locomotive, with an axle passing from side to side across the middle or nearly so of said frame, with a pulley wheel on the middle of the axle, and a wheel at each end of the same for receiving and retaining brooms or brushes composed of wire, wood, or other fit substance. From the aforesaid pulley wheel, a cross band passes to another pulley wheel fastened to the middle of the axle sustaining the fore wheels of the car or locomotive, thus causing the wheels of the machine containing the brushes to revolve in a contrary direction to the wheels of the locomotive, which said pulley wheel so applied to the axle of the locomotive for the above purpose, is also a part of our improvement. The axle of the machine is also so arranged as to be raised or lowered, as the length of the brushes may require their being brought nearer to, or removed farther from the railroad track.

Instead of pulley wheels, the machine may be set in motion and be connected with the locomotive by means of cog wheels or by cranks; and the wheels containing the brushes may be hung perpendicularly or horizontally, and may be made to revolve in any required direction. The scrapers are attached to the fore part of the frame, at the lower end of a perpendicular handle made fast to the frame but movable backward and forward. The scrapers are so fixed as to hang obliquely across the railroad track, and about the eighth of an inch above it. Immediately behind the perpendicular handle of the scrapers and resting against it is a spring to press back the scraper to its proper position when thrown too far forward by substances striking against it by a retrograde movement of the locomotive. Farther behind the handle is placed a perpendicular straight spring of proper construction, from the top of which passes a cord, chain, or rod to the top of the scraper handle, to keep the scraper sufficiently firm, and at the same time to be elastic enough to allow the scraper to yield when coming in contact with anything that is immovable. The motion of the scrapers may also be regulated by cords and weights, instead of the above mode.

When put in motion, the scrapers will push ice, snow, and other obstructions off the track, and the brushes revolving on the wheels in a direction contrary to that of the locomotive wheels, will tear up ice and brush snow and other obstacles from the track, throwing them out of the way of the locomotive.

In addition to the above there is an ash box (to contain ashes or similar substance) lined with leather, and of a sufficient width to fit a portion of the circumference of the rear wheel of the locomotive, and which is to be fastened immediately over said wheel in close contact with it, so as to allow the ashes gradually to fall on the edge of the wheel and give it a sufficient roughness to prevent its sliding when passing over ice or other slippery substance.

What we claim as our invention and desire to secure by Letters Patent, are—

1. The revolving brushes, together with such variations of the said principle or mode of operating, as will produce analogous results by means substantially the same, in combination with the oblique scrapers; the whole being arranged and operating as herein described.

2. We also claim the placing of the oblique scrapers on movable handles resting against and regulated by the springs as herein specified.

JOHN W. DENNISSON.
ELIAS KIRKPATRICK.

Witnesses:
HELEN WILSON,
ALLEN WILSON.